United States Patent
Lane et al.

(10) Patent No.: US 7,925,203 B2
(45) Date of Patent: Apr. 12, 2011

(54) SYSTEM AND METHOD FOR CONTROLLING BROADCAST MULTIMEDIA USING PLURAL WIRELESS NETWORK CONNECTIONS

(75) Inventors: Richard Doil Lane, San Diego, CA (US); William Robert Gardner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/748,603

(22) Filed: Dec. 29, 2003

(65) Prior Publication Data
US 2004/0142661 A1 Jul. 22, 2004

Related U.S. Application Data

(60) Provisional application No. 60/442,007, filed on Jan. 22, 2003.

(51) Int. Cl.
*H04H 40/00* (2008.01)
(52) U.S. Cl. ...................................... 455/3.06; 370/486
(58) Field of Classification Search .................. 173/163, 173/166, 171; 455/414.1, 414.3, 425, 427, 455/45, 503, 161.2, 3, 3.01, 3.05, 3.06, 411; 370/486
See application file for complete search history.

(56) References Cited

U.S. PATENT DOCUMENTS

| | | | |
|---|---|---|---|
| 6,172,673 B1 | 1/2001 | Lehtinen et al. | |
| 6,429,812 B1 | 8/2002 | Hoffberg | |
| 6,574,794 B1 | 6/2003 | Sarraf | 725/63 |
| 7,072,865 B2 | 7/2006 | Akiyama | |
| 7,283,817 B2 * | 10/2007 | Salo et al. | 455/426.1 |
| 2002/0001386 A1 * | 1/2002 | Akiyama | 380/201 |
| 2002/0059614 A1 * | 5/2002 | Lipsanen et al. | 725/75 |
| 2003/0026424 A1 * | 2/2003 | McGarrahan et al. | 380/255 |
| 2003/0078061 A1 * | 4/2003 | Kim | 455/466 |
| 2003/0084283 A1 * | 5/2003 | Pixton | 713/163 |
| 2005/0157693 A1 * | 7/2005 | Lopez et al. | 370/342 |

FOREIGN PATENT DOCUMENTS

| | | |
|---|---|---|
| DE | 19905628 | 8/2000 |
| EP | 1081884 A2 | 3/2001 |
| GB | 2370456 | 6/2002 |
| WO | WO9628904 A1 | 9/1996 |
| WO | WO9914775 | 3/1999 |
| WO | 0203698 | 1/2002 |

OTHER PUBLICATIONS

International Preliminary Examination Report—PCT/US2004/001882, International Preliminary Examining Authority—US Patent Office—May 23, 2005.
International Search Report—PCT/US2004/001882, International Search Authority—European Patent Office—Mar. 10, 2005.
Written Opinion—PCT/US2004/001882, International Search Authority—US Patent Office—Mar. 10, 2005.

* cited by examiner

*Primary Examiner* — Tu X Nguyen
(74) *Attorney, Agent, or Firm* — Gerald P. Joyce, III

(57) ABSTRACT

Digital multimedia is broadcast to wireless receivers on a unidirectional wireless broadcast channel, while control data necessary for presentation of the multimedia is provided on a bidirectional, point-to-point wireless link.

43 Claims, 2 Drawing Sheets

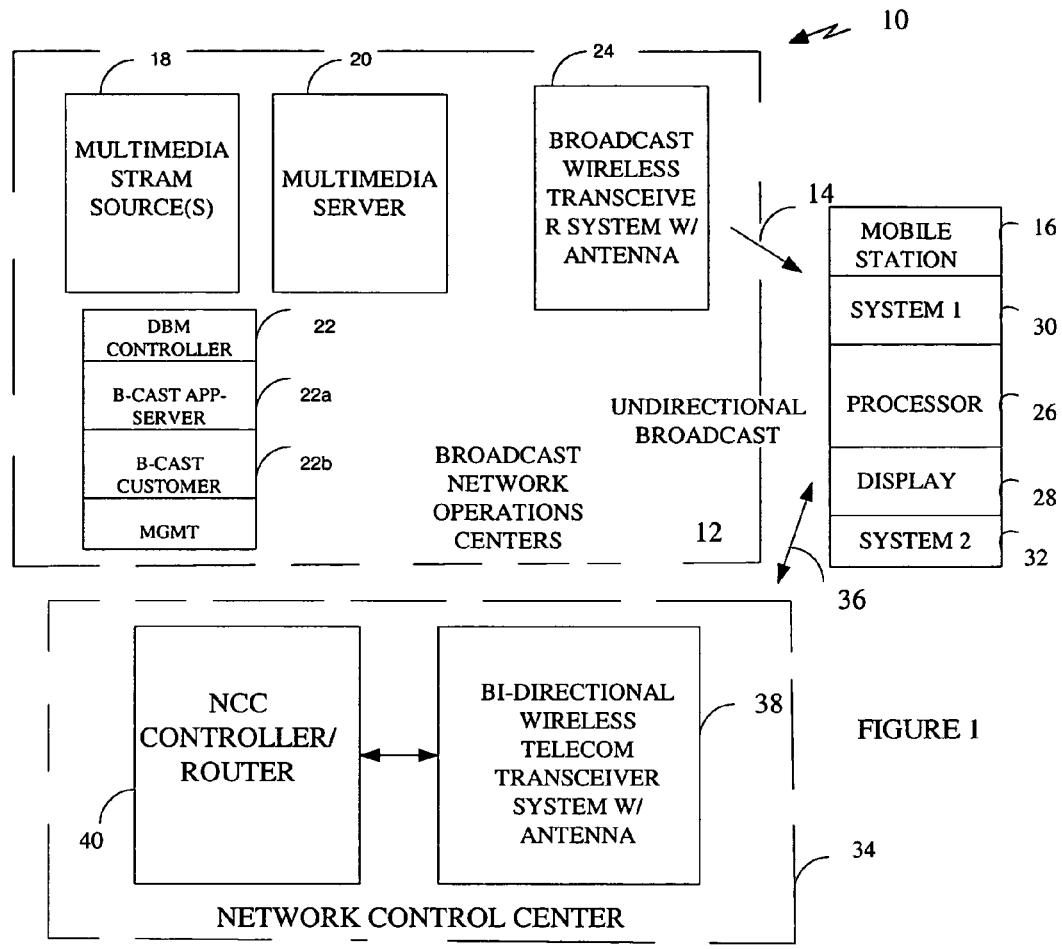
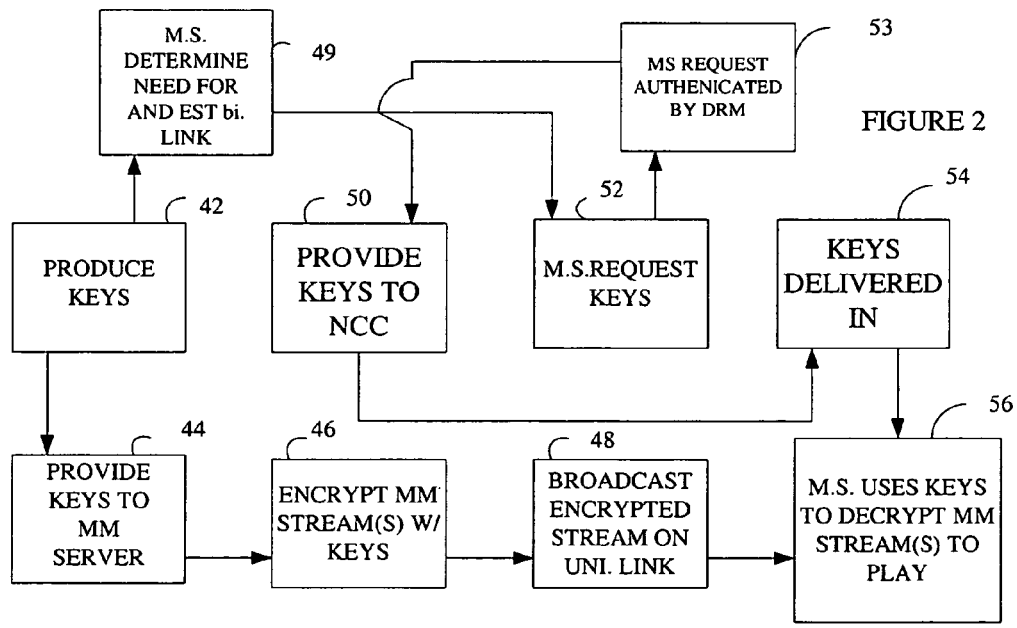

SYSTEM AND METHOD FOR CONTROLLING BROADCAST MULTIMEDIA USING PLURAL WIRELESS NETWORK CONNECTIONS

CROSS-REFERENCE TO RELATED APPLICATION

This application claims the benefit of U.S. Provisional Patent Application Ser. No. 60/442,007, filed Jan. 22, 2003, which is incorporated herein by reference in their entirety.

FIELD OF THE INVENTION

The present invention relates generally to computer-based communication systems.

BACKGROUND OF THE INVENTION

Digital multimedia data such as video and music can be transmitted wirelessly to mobile receivers, such as wireless telephones, for playing of the multimedia by users of the mobile receivers. Such data typically may be broadcast.

In addition to the multimedia data itself, ancillary control data must also be provided to the receivers. This control data includes, e.g., decryption keys for decrypting the multimedia data, which may be encrypted to protect rights in the media. Also, the control data can include information related to a user's subscription to the broadcast, a user's registration for the broadcast service, billing information, and access control data.

Current methods for the wireless broadcast provision of digital media send the control data along with the multimedia data. As recognized herein, this reduces the amount of communication bandwidth that is available to carry the multimedia data, which tends to be bandwidth-intensive. Moreover, the present invention recognizes that sending, e.g., decryption keys along with the multimedia data to be decrypted by the keys poses security problems, even if mere possession of the keys, without more, is insufficient to easily decrypt the content. An unauthorized eavesdropper who intercepts the encrypted content also receives at least some information useful in decrypting it, and consequently is that much closer to pirating the content.

SUMMARY OF THE INVENTION

A communication system includes a broadcast center wirelessly broadcasting multimedia streams to wireless receivers over a wireless broadcast link. The receivers are provided with control data associated with the multimedia stream over a bidirectional wireless link.

In a preferred embodiment, the bidirectional wireless link may be a CDMA link, an 802.11 link, or a Bluetooth link. The bidirectional wireless link may also be a point-to-point wireless communication link.

In exemplary embodiments, the control data can include encryption keys useful in decrypting the multimedia stream. The control data can also include data associated with a subscription to a multimedia broadcast service, data associated with a registration on a multimedia broadcast network, and applications useful in playing the multimedia data. Moreover, the control data can include billing information, data related to user preferences, and data related to levels of service related to providing the multimedia stream.

In a particularly preferred embodiment, a multimedia server containing a digital rights management (DRM) server is provided and is useful for encrypting the multimedia streams. Also, a digital broadcast multimedia (DBM) controller is provided and is useful for obtaining encryption keys from the DRM server and transmitting the keys to authorized users. Also, the DBM controller can use a network control center (NCC) transmitting keys to the authorized users' receivers. The network control center communicates with the wireless receivers over the bidirectional wireless link. An application server may be associated with the DBM controller for providing applications to receivers that are related to playing multimedia streams. An application server may also be associated with the network control center for providing to receivers additional applications related to playing multimedia streams. Some or all of the above-mentioned servers may be separate from each other or integrated together.

In another aspect, a method for providing a multimedia stream to a wireless communication device includes broadcasting the multimedia stream over a wireless broadcast channel, and transmitting, over a bidirectional wireless link, control data necessary for displaying the multimedia stream on the device.

In still another aspect, a wireless client station capable of communicating using at least two communication links includes a processor receiving a digital multimedia stream on a broadcast channel and control data on a bidirectional wireless link. The processor uses the control data to enable presentation of the multimedia stream on a display.

In yet another aspect, a system for providing a multimedia stream to a wireless communication device includes means for broadcasting the multimedia stream over a wireless broadcast channel. Also, the system includes means for transmitting, over a bidirectional wireless link, control data necessary for displaying the multimedia stream on the device.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system;

FIG. 2 is a flow chart of the present process for providing broadcast multimedia streams on a broadcast unidirectional channel and control data and encryption keys on a bidirectional point to point link;

DETAILED DESCRIPTION OF THE PREFERRED EMBODIMENT

Figure 3:
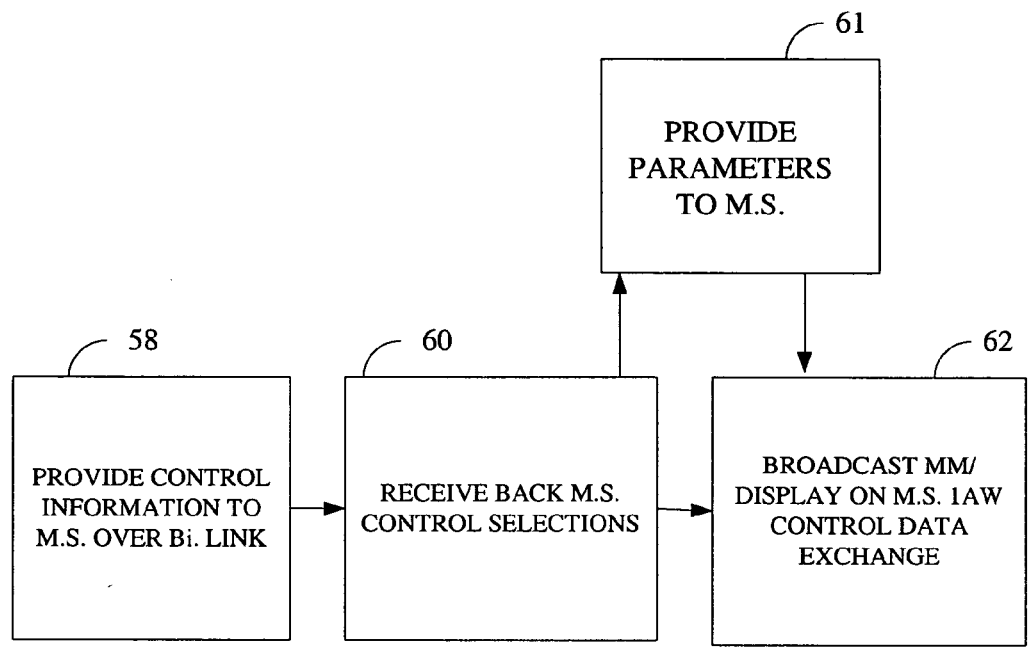
FIG. 3 is a flow chart showing the logic of control information transfer.

Referring initially to FIG. 1, a system is shown, generally designated 10, that includes a broadcast network operations center (NOC) 12 which wirelessly broadcasts, using a preferably unidirectional channel 14, digital multimedia content in the form of multimedia streams to wireless mobile stations 16 (only a single mobile station 16 shown for clarity). Also, program timing and code information can be received by the mobile station 16 over paging and/or synchronization channels of the broadcast channel 14 to track program slots (for DO-based architectures) or Walsh channels (for CDMA-based architectures).

The multimedia streams can be from one or more sources 18 that communicate with or are otherwise associated with the NOC 12. The streams can be sent to a computer-implemented multimedia server 20, which, if desired, can include a separate or integral digital rights management (DRM) server to encrypt the streams in accordance with digital rights management principles known in the art using encryption keys generated by the server 20 or provided over a bidirectional link by a digital broadcast media (DBM) controller 22 or other source. The multimedia server 20 can thus include an integrated or separate digital rights management center that provides encryption keys as appropriate to enforce digital rights policies.

The preferred DBM controller 22 can include a broadcast application server 22a, such as a BREW server, that provides, through the bidirectional link discussed further below, software and updates to the mobile station 16. Also, the preferred non-limiting DBM controller 22 can include a broadcast customer manager 22b that exchanges data with the mobile station 16 through the bidirectional link discussed below relating to control, subscription services, and billing. If desired, the broadcast application server 22a and broadcast customer manager 22b can be physically separate from the DBM controller 22 but nonetheless can communicate with the DBM controller 22.

The multimedia streams are transmitted by a unidirectional broadcast wireless transceiver system 24 of the NOC 12. The transceiver system 24 can use, without limitation, CDMA principles, GSM principles, or other wireless principles including wideband CDMA (WCDMA), cdma2000 (such as cdma2000 1X or 3X air interface standards, for example), TDMA, or TD-SCDMA, and OFDM.

As shown, the mobile station 16 includes a processor 26 that drives an audio, video, or audio/video (A/V) display 28, for presenting the multimedia streams on the display 28. Also, the mobile station 16 includes at least one and in some cases two (or more) communication receiver systems 30, 32. The first system 30 is configured for communicating with the NOC 12. In contrast, the second system 32 is configured for communicating over a bidirectional point-to-point link. When more than one receiver is used, both receivers may be implemented on the same computer chip if desired.

FIG. 1 also shows that in one non-limiting embodiment a network control center (NCC) 34 communicates with the mobile station 16 over a bidirectional point-to-point link 36. Also, the NCC 34 communicates with the NOC 12 in accordance with principles to be shortly disclosed, to effectively establish a second path for data communication between the NOC 12 and the mobile station 16 in addition to the unidirectional broadcast link 14. In alternate embodiments, the second path of communication between the mobile station 16 and DBM controller 22 can be through a bidirectional wireless point-to-point link that does not necessarily pass through a NCC, but which can be, e.g., a Bluetooth link, a satellite link, or a 802.11 link directly to the DBM controller 22.

The NCC 34 can be the NCC of a commercial wireless telephone company. When the communication principles of the link 36 preclude use of the same communication receiver in the mobile station as is used for communicating with the NOC 12, the second receiver 32 of the mobile station 16 is used to communicate with the NCC 34. The bidirectional link 36 can be, e.g., a CDMA-based or GSM-based link.

When an NCC 34 is used, the NCC 34 may include a bidirectional wireless transceiver system 38 for two-way communication of data to and from the mobile station 16 in accordance with the disclosure below. An NCC controller/router 40 can also be included in the NCC 34, for receiving, e.g., encryption keys and other information, including software and software updates, from the DBM controller 22 and sending the information to the mobile station 16 for, e.g., decryption of encrypted multimedia streams received on the broadcast channel 14. Other control data, discussed below, from the DBM controlled 22 can be exchanged between the DBM controller 22 and NCC controller 40. The NCC controller 40 and DBM controller 22 preferably communicate using a secure connection, such as a virtual private network (VPN) over an Internet connection, although other links can be used.

Accordingly, it may now be appreciated that "control data" may encompass encryption keys as well as other types of information typically necessary to support commercial provision of multimedia on the broadcast channel 14. This can include data associated with a subscription to a multimedia broadcast service, as well as data associated with a registration on a multimedia broadcast network. Also, the control data may include software applications, such as BREW applications or BREW-supplied applications that are useful in playing the multimedia data or in viewing available titles. Moreover, control data that can be exchanged between the mobile station 16 and the DBM controller 22 via, e.g., the NCC 34 can include service or product ordering information and data related to user preferences, as well as data related to levels of service related to providing the multimedia stream. Also, data that is necessary for billing can be exchanged between the DBM controller 22 and the NCC controller 40. Further, a user of the mobile station can order products and services over the bidirectional link. The control data may also include data useful for de-interleaving, decompressing, and decoding the multimedia stream, as well as data that is useful for indexing into the multimedia stream for channel selection and tracking.

For instance, a user of the mobile station 16 can register on the broadcast network using the bidirectional link 36. The user can also subscribe to various multimedia broadcast services that might be provided on the broadcast channel 14, and can indicate a preference for a level of service (e.g., base layer only, base layer plus enhancement layer, etc.) and be billed accordingly. Moreover, the user can receive a list of available program titles over the link 36 and select a title of a multimedia stream for reception on the broadcast channel 14.

The process of the present invention can be appreciated in reference to FIG. 2, which can be undertaken using a computer. Commencing at block 42, encryption keys are produced in accordance with key principles known in the art by, e.g., the DRM center that is associated with the multimedia server 20, or by the DBM controller 22. A standard rights expression language such as XrML, ODRL, etc. can be employed to express license rights of individual users. Encryption methods such as the Advanced Encryption Standard (AES) or others can be used for the generation of keys and the encryption of multimedia streams. At block 44, the keys are provided to the multimedia server 20 of the NOC 12 and at block 46 the keys are used to encrypt multimedia streams to be broadcast at block 48.

FIG. 2 illustrates that in parallel with the above logic, once the keys are produced at block 42 they can be provided, using the DBM controller 22, to the mobile station over the bidirectional link 36 through the NCC 34. The mobile station 16 determines the need for one or more program keys for decoding one or more multimedia streams and requests a data connection over the bidirectional link 36 through the NCC 34 at block 49. The mobile station 16 requests the keys from the DRM server at block 52. At block 53, the M.S. request (its right to receive the keys) is authenticated by the DRM server. Assuming the mobile station is authorized to receive the keys, the keys are sent from the DBM controller 22 to the NCC controller/router 40 at block 50. From there, the keys are sent to the mobile station 16 at block 54 using the bidirectional link 36, either directly from the DBM controller 22 (when the link 36 is a Bluetooth or 802.001 link, for example, which directly links the controller 22 to the mobile station 16) or through the NCC 34. At block 56 the mobile station decrypts the content received on the broadcast channel 14 using the keys received on the bidirectional point to point link 36.

Now referring to FIG. 3, at block 58 certain control information mentioned above can be provided for selection by the mobile station 16 over the bidirectional link 36. For example, control information relating to allowing a user of the mobile station 16 to register or to select particular programs, or subscriptions, or broadcast fidelity options, and so on as mentioned above can be provided so that the user can appropriately select desired service options and transmit the selections back to the DBM controller 22 (through, e.g., the NCC 34) at block 60. In response, information is stored by the broadcast customer manager 22b and any parameters to decode the multimedia stream are transmitted back to the M.S. 16 over the bidirectional link 36 at block 61. At block 62 the multimedia streams associated with the control information exchange are sent to and decoded by the mobile station 16.

Figure 4:
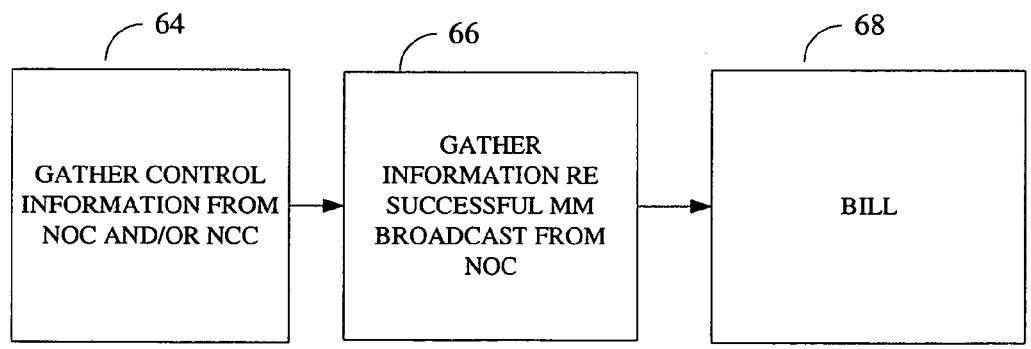
FIG. 4 is a flow chart of the billing logic.

Likewise, FIG. 4 shows that billing information may be exchanged over the bidirectional link 36. Commencing at block 64, control information relating to, e.g., particular programs or subscriptions or broadcast fidelity options that may have been selected by the user of the mobile station 16 is gathered from the DBM controller 22 at the NOC 12. In some implementations the control information may be retained temporarily by the NCC 34, in which case the control information is gathered from temporary storage. Also, at block 66 information relating to the services actually successfully provided to the mobile station 16 are gathered. The customer user of the mobile station 16 is billed at block 68 using the information gathered at blocks 64 and 66.

While the particular SYSTEM AND METHOD FOR CONTROLLING BROADCAST MULTIMEDIA USING PLURAL WIRELESS NETWORK CONNECTIONS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act".

What is claimed is:

1. A communication system, comprising:
    at least a broadcast center configured to wirelessly broadcast at least one multimedia stream
    over a wireless broadcast link to a first wireless receiver, wherein the broadcast link is characterized by a first wireless principle and configured to provide
    control data associated with the multimedia stream over a bidirectional wireless link to a second receiver, wherein the bidirectional wireless link is characterized by a second wireless principle, wherein the wireless broadcast link and the bidirectional wireless link are separate physical channels, wherein the first and second wireless principles are different from each other, wherein the first wireless receiver and the second receiver are both part of the same receiving device, and wherein the control data includes data useful for de-interleaving, decompressing, and decoding the multimedia stream.

2. The system of claim 1, wherein the broadcast link is unidirectional and wherein the first wireless principle is selected from the group consisting of: CDMA principles, GSM principles, OFDM principles, WCDMA principles, TDMA principles, and TD-SCDMA principles.

3. The system of claim 1, wherein the second wireless principle is selected from the group consisting of: a CDMA link, a GSM link, a 802.11 link, a satellite link, and a Bluetooth link.

4. The system of claim 1, wherein the bidirectional wireless link is a point-to-point wireless communication link.

5. The system of claim 1, wherein the first wireless receiver and the second receiver are associated with a mobile communication device having at least one display for displaying the multimedia data.

6. The system of claim 1, wherein the first wireless receiver and the second receiver are associated with a mobile communication device having at least one speaker for presentation of multimedia audio data.

7. The system of claim 1, wherein services are ordered over the bidirectional link.

8. The system of claim 1, wherein products are ordered over the bidirectional link.

9. The system of claim 1, further comprising at least one digital broadcast multimedia (DBM) controller useful at least for encrypting, encoding and/or aggregating the multimedia stream.

10. The system of claim 1, wherein the control data includes data useful for indexing into the multimedia stream for channel selection and tracking.

11. The system of claim 9, further comprising at least one network control center communicating with the DBM controller at least for receiving keys therefrom, the network control center communicating with the second receiver over the bidirectional wireless link.

12. The system of claim 11, further comprising at least one NCC controller associated with the network control center at least for providing to receivers applications related to playing multimedia streams.

13. The system of claim 11, further comprising at least one network operations controller (NOC) associated with the broadcast network operations center at least for providing to receivers applications related to playing multimedia streams through a bidirectional wireless link.

14. The system of claim 1, wherein the control data is selected from the group consisting of:
    at least one key useful in decrypting the multimedia stream, data associated with a subscription to a multimedia broadcast service, data associated with a registration on a multimedia broadcast network, at least one application useful in decoding the multimedia data, billing information, data related to user preferences, and data related to levels of service related to providing the multimedia stream.

15. A method for providing a multimedia stream to a wireless communication device, comprising:
broadcasting the multimedia stream over a wireless broadcast link to a first receiver, wherein the broadcast link is characterized by a first wireless principle; and
transmitting, over a bidirectional wireless link to a second receiver, control data necessary for displaying the multimedia stream on the device, wherein the bidirectional wireless link is characterized by a second wireless principle, and wherein the wireless broadcast link and the bidirectional wireless link are separate physical channels, and the first and second wireless principles are different from each other, and the first wireless receiver and the second receiver are both part of the same receiving device, and wherein the control data includes data useful for de-interleaving, decompressing, and decoding the multimedia stream.

16. The method of claim 15, wherein at least some control data is transmitted to the wireless device.

17. The method of claim 15, wherein at least some control data is transmitted from the wireless device.

18. The method of claim 15, wherein the broadcast link is unidirectional.

19. The method of claim 18, wherein the first wireless principle is selected from the group consisting of: CDMA principles, GSM principles, OFDM principles, WCDMA principles, TDMA, principles, and TD-SCDMA principles.

20. The method of claim 15, wherein the second wireless principle-is selected from the group consisting of a 802.11 link, a Bluetooth link, a satellite link, a CDMA link, a GSM link, and a OFDM link, and is a point-to-point wireless communication link.

21. The method of claim 15, wherein the first wireless receiver and the second receiver are associated with a mobile communication device having at least one display for displaying the multimedia stream and at least one speaker for presentation of multimedia audio data.

22. The method of claim 15, wherein the control data includes at least one key useful in decrypting the multimedia stream.

23. The method of claim 15, wherein the control data includes data associated with a subscription to a multimedia broadcast service.

24. The method of claim 15, wherein the control data includes data related to levels of service related to providing the multimedia stream.

25. The method of claim 15, wherein the multimedia stream is digital and is encrypted.

26. The method of claim 15, wherein the control data includes data useful for indexing into the multimedia stream for channel selection and tracking.

27. The method of claim 15, comprising ordering at least one of: services, and products, over the bidirectional link.

28. The method of claim 15, wherein the control data is selected from the group consisting of:
data associated with a registration on a multimedia broadcast network, at least one application useful in playing the multimedia data, billing information, and data related to user preferences.

29. A wireless client station capable of communicating using at least two communication links, comprising:
at least one processor receiving on a first receiver a digital multimedia stream received on a wireless broadcast link, wherein the broadcast link is characterized by a first wireless principle and on a second receiver control data received on a bidirectional wireless link, wherein the control data includes data useful for de-interleaving, decrypting, decompressing, and decoding the multimedia stream, wherein the bidirectional wireless link is characterized by a second wireless principle, wherein the wireless broadcast link and the bidirectional wireless link are separate physical channels and the first and second wireless principles are different from each other, and wherein the wireless client station comprises both the first receiver and the second receiver; wherein
the processor uses the control data to enable presentation of the multimedia stream on a display.

30. The client station of claim 29, wherein the broadcast link is unidirectional and the first wireless principle is selected from the group consisting of: CDMA principles, GSM principles, OFDM principles, WCDMA principles, TDMA, principles, and TD-SCDMA principles.

31. The client station of claim 29, wherein the second wireless principle is selected from the group consisting of: a CDMA link, a 802.11 link, a GSM link, a satellite link, and a Bluetooth link.

32. The client station of claim 29, wherein the bidirectional wireless link is a point-to-point wireless communication link.

33. The client station of claim 29, wherein the control data includes at least one key useful in decrypting the multimedia stream.

34. The client station of claim 29, wherein the control data includes data associated with a subscription to a multimedia broadcast service and/or data associated with a registration on a multimedia broadcast network.

35. The client station of claim 29, wherein the control data includes at least one application useful in playing the multimedia data.

36. The client station of claim 29, wherein the multimedia stream is digital and is encrypted.

37. The client station of claim 29, wherein the control data includes data useful for indexing into the multimedia stream for channel selection and tracking.

38. The client station of claim 29, wherein at least one of: services, and products, can be ordered over the bidirectional link.

39. The client station of claim 29, wherein the control data includes billing information data related to user preferences and/or data related to levels of service related to providing the multimedia stream.

40. A system for providing a multimedia stream to a wireless communication device, comprising:
means for broadcasting the multimedia stream over a wireless broadcast link to a first receiver, wherein the broadcast link is unidirectional and is characterized by selecting one from the group consisting of: CDMA principles, GSM principles, OFDM principles, WCDMA principles, TDMA, principles, and TD-SCDMA principles; and
means for transmitting, over a bidirectional wireless link to a second receiver, wherein the bidirectional wireless link is characterized by selecting one from the group consisting of: a CDMA link, a 802.11 link, a GSM link, a satellite link, and a Bluetooth link, control data necessary for displaying the multimedia stream on the device, wherein the control data includes data useful for de-interleaving, decrypting, decompressing, and decoding the multimedia stream, wherein the wireless broadcast link and the bidirectional wireless link are separate physical channels, and wherein the first and second receivers are both part of the same receiving device, and the first and second wireless principles are different from each other.

41. The system of claim 40, further comprising means for encrypting the multimedia stream.

42. The system of claim 41, means for communicating with the encrypting means at least for receiving keys therefrom, the means for communicating with the second receiver over the bidirectional wireless link.

43. The system of claim 42, further comprising means, communicating with the means for communicating, for providing, to receivers, applications related to playing multimedia streams.

* * * * *

UNITED STATES PATENT AND TRADEMARK OFFICE
CERTIFICATE OF CORRECTION

PATENT NO. : 7,925,203 B2  
APPLICATION NO. : 10/748603  
DATED : April 12, 2011  
INVENTOR(S) : Lane et al.

Page 1 of 1

It is certified that error appears in the above-identified patent and that said Letters Patent is hereby corrected as shown below:

Column 07, line 33, claim 19: "TDMA, principles" to read as --TDMA principles--

Column 08, line 23, claim 30: "TDMA, principles" to read as --TDMA principles--

Column 08, line 59, claim 40: "TDMA, principles" to read as --TDMA principles--

Signed and Sealed this
First Day of May, 2012

David J. Kappos
*Director of the United States Patent and Trademark Office*